United States Patent Office 3,318,865
Patented May 9, 1967

3,318,865
1-(2-BENZOTHIAZOLYLAZO)-2-NAPHTHOL
DYESTUFFS
Paul L. Stright, Erie, N.Y., assignor to Allied Chemical
Corporation, New York, N.Y., a corporation of New
York
No Drawing. Filed Mar. 18, 1966, Ser. No. 535,320
5 Claims. (Cl. 260—158)

This invention relates to novel water-insoluble monoazo compounds. More particularly it is concerned with novel water-insoluble 1-(2-benzothiazolylazo)-2-naphthol compounds containing a substituent in the arylene portion of the benzothiazole moiety, which compounds are useful for the coloration of normally solid polymers of a-olefins having 2 to 3 carbon atoms in each unit and containing a Werner complex forming metal.

This application is a continuation-in-part of my copending application Ser. No. 261,867 filed Feb. 28, 1963, and now abandoned, which application is a continuation-in-part of application Ser. No. 196,921 filed May 23, 1962 now abandoned. The latter application discloses a process for dyeing normally solid polymers of a-olefins having 2 to 3 carbon atoms and containing a Werner complex forming metal which comprises contacting such solid polymer with an aqueous dispersion of a benzothiazolylazo compound which contains at least one group capable of forming a metal chelate with said metal.

Polymers of a-olefins such as ethylene and propylene have been produced in steadily increasing quantities and grades in recent years, and because of their many valuable characteristics including mechanical strength, high elasticity, resistance to solvents and other elements, they have found their way into a multitude of useful applications in the form of films, filaments, yarns, fabrics, ropes, molded products, and the like. However, because of their extreme chemical inertness and hydrophobic character, these materials have shown little affinity for dyestuffs and pigments generally available for the coloration of natural and synthetic materials. Thus attempts to effect the coloration of a-olefin polymers by compounding pigments into the resin, as in Banbury mixers, compound extruders or the like, were not entirely satisfactory due to the difficulty in obtaining adequate dispersion of the pigment. Disperse dyestuffs produce light to medium shades in poly-a-olefins although the fastness to light and washing of such colorations leaves much to be desired.

The receptivity of the polymers for known classes of dyestuffs has been improved by grafting or otherwise introducing polymeric chains containing functional groups to the polyolefin. However, such measures while successful add to the cost of the resultant fiber.

An object of this invention is to devise novel monoazo dyestuffs suitable for application to polymers of a-olefins.

Another object is to devise a novel group of water-insoluble benzothiazolylazo-2-naphthol compounds which dye polyolefins containing a Werner complex forming metal in deep blue shades of exceptional fastness characteristics.

These and other objects and advantages of the present invention will become obvious from the detailed description set forth hereinbelow.

The novel compounds of my invention possess the following general formula:

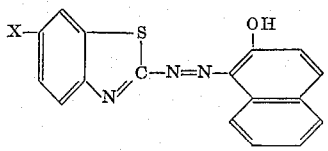

in which X represents a substituent of the group consisting of lower alkoxy, nitro and halogen.

These novel products can be prepared by several well known methods generally used for the preparation of monoazo dyestuffs. Preferably a 2-aminobenzothiazole containing a substituent of the class defined above in the 6-position is diazotized and coupled into β-naphthol in aqueous alkaline medium. The product is practically insoluble in the coupling mass and can conveniently be isolated therefrom by filtration or similar means. The isolated product can be prepared for use as a "disperse" dyestuff by admixture with dispersing agents and the dyestuff composition applied as disclosed in the aforementioned co-pending U.S. application.

The novel products of my invention have the surprising property of dyeing normally solid polymers of a-olefins having two to three carbon atoms and containing a Werner complex forming metal in deep blue shades characterized by excellent fastness to light, to washing, to dry cleaning solvent and to crocking.

Alteration of the unique structure of my novel group of compounds results in products which although they may color polyolefins give rise to dyed materials of considerably lesser fastness particularly to light. Thus the dyestuff in which the β-naphthol component is replaced by 4-tertiary amyl-β-naphthol, or 8-acetamido-β-naphthol gives rise to monoazo products which dye polypropylene containing a Werner complex forming metal in blue shades of relatively poor fastness to light.

Suitable benzothiazole compounds for use in the preparation of the novel dyestuffs of this invention include the following:

2-amino-6-methoxybenzothiazole
2-amino-6-ethoxybenzothiazole
2-amino-6-butoxybenzothiazole
2-amino-6-hexoxybenzothiazole
2-amino-6-nitrobenzothiazole
2-amino-6-fluorobenzothiazole
2-amino-6-chlorobenzothiazole
2-amino-6-bromobenzothiazole Any of these aminobenzothiazoles, or equivalent derivatives when diazotized and coupled into β-naphthol in alkaline media yield the novel dyes of my invention.

The unique dyestuffs are substantially insoluble in the aqueous dyebath, which is preferably maintained at a pH of 5 or less. They are applied in the form of aqueous dispersions in the manner of the well known "disperse dye" class. Such dyes, as is known, are in a finely divided condition and usually are assisted by intimate admixture with dispersing agents and other dyeing adjuvants. The dispersing agents may be of the anionic, cationic or preferably non-ionic class.

The amount of dyestuff employed relative to the amount of polyolefin material to be dyed can be varied over a wide range. The particular amount used will depend to a major extent upon the depth of shade desired. In most instances, deep shades can be obtained from 0.5% dyeings, which shades are increased but little in intensity by increasing the dye concentrations to 2.0% or more. Light shades can be obtained by the use of as little as 0.05% or less of the dyestuff.

Although the novel compounds of my invention are of particular value and utility as colorants for polypropylene containing a Werner complex forming metal, they can be used to impart deep shades to other synthetic fibers, e.g., cellulose esters (e.g. "Arnel"), polyester (e.g. "Dacron"), polyamides ("nylon") and the like.

The following examples illustrate the present invention. The temperatures are given in degrees centigrade and parts and percentages are by weight unless otherwise indicated.

Example I

To 54 parts of nitrosylsulfuric acid (equivalent to 0.053 mole NaNO₂), 9.7 parts of 2-amino-6-ethoxybenzothiazole were added. The thick mixture was diluted with about 25 parts of sulfuric acid and the mass was agitated for about one hour. The mixture was poured into about 200 parts of ice and the resulting solution was filtered to remove a small amount of insoluble brownish precipitate. The clarified filtrate was added to a solution of 9.2 parts of β-naphthol, 100 parts of sodium carbonate and about 9.0 parts of 50° Bé. sodium hydroxide in 500 parts of water. The addition required about one hour during which period, the coupling mass was maintained alkaline by the addition of about 40 parts of soda ash. The mixture was agitated for about 16 hours and then filtered. The filter cake was washed with 1500 parts of 20% aqueous sodium chloride containing 1% sodium hydroxide. The washed cake was reslurried with 500 parts of water containing about 5 parts of sodium hydroxide. After the addition of 100 parts of sodium chloride, the slurry was filtered and washed with 1000 parts of 20% sodium chloride containing 1% sodium hydroxide. The filter cake was again reslurried in 500 parts of water, and after the addition of 20° Bé. hydrochloric acid until the slurry reacted neutral to Nitrazine Yellow, it was filtered and washed with 1000 parts of water. The washed cake was dried and the resulting dark brown powder melted at 218° to 220°. The product 1-(6-ethoxy-2-benzothiazolylazo)-2-naphthol having the formula

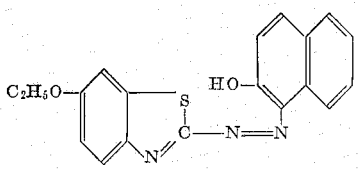

dyed polypropylene containing a nickel compound in bluish shades. The dyed polypropylene was exceptionally fast to light (more than 100 hours in the Fade-Ometer), to washing, to dry cleaning solvents and to crocking. The dyestuff also produced deep shades of "nylon," "Arnel" and "Dacron."

Example II

In a substantially identical manner to that described in Example I above, 2-amino-6-methoxybenzothiazole instead of 2-amino-6-ethoxybenzothiazole, was diazotized and coupled into β-naphthol, yielding a water-insoluble monoazo dyestuff, melting at 225° to 232°, of the following formula

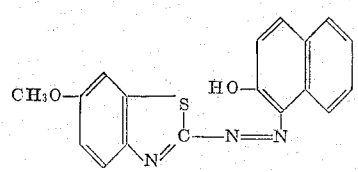

This product when dyed on nickel containing polypropylene material gave deep bluish shades, which were of slightly greener tone than those produced by the product of Example I but which possessed equally excellent fastness characteristics.

Example III

A hot (95°) solution of 4.88 parts of 2-amino-6-nitrobenzothiazole in 100 parts of glacial acetic acid was added portionwise to a cool (15° to 20°) mixture of 30 parts of glacial acetic acid and 25 parts of nitrosylsulfuric acid (prepared from 0.025 mol. of sodium nitrite) and the mass was agitated for 1½ hours. The dark orange diazo solution was added slowly (½ hour) to a solution of 3.65 parts of β-naphthol in 100 parts glacial acetic acid at 15°. The mixture was agitated for ½ hour, diluted with 500 parts of water and sufficient ice to cool the mixture to 15°, and the mass was agitated for about 16 hours.

The product slurry was filtered and washed with 2000 parts of water. The washed cake was reslurried in 500 parts of water for 1½ hours, and after the addition of about 6 parts of 50° Bé. caustic soda, the slurry was agitated for 3 hours. The mass was filtered and washed with 250 parts of 1% aqueous sodium hydroxide.

The filter cake was reslurried in 500 parts of water for 1 hour. The slurry was made neutral to Nitrazine Yellow with 20° Bé. hydrochloric acid and then filtered and washed with water. The cake was dried to yield a dark brown solid melting at 298° to 310°. The product, 1-(6-nitro-2-benzothiazolylazo)-2-naphthol, having the formula

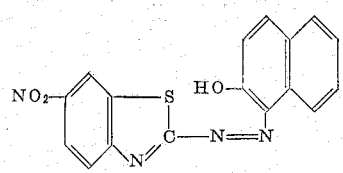

dyed polypropylene, containing a nickel compound, in blue shades of excellent fastness to light, to washing, to dry cleaning and to crocking.

Example IV

Nitrosylsulfuric acid, prepared from 21.6 parts NaNO₂ and 278 parts 100% H₂SO₄, was added to a solution of 36.9 parts 2-amino-6-chlorobenzothiazole in 75.5 parts of water, 32.2 parts of 100% H₂SO₄ and 1030 parts of 50° Bé. H₂SO₄ during 2 hours while maintaining the temperature at 0–5° C. The diazo solution thus obtained was poured during 3 hours into a solution of 50.3 parts of 2-naphthol, 400 parts Na₂CO₃ and about 37 parts of 50° Bé. NaOH in 2000 parts water while maintaining the reaction mixture at 0–10° C. and at Brilliant Yellow alkalinity. The mass was further agitated for 18 hours, made neutral to Delta paper with 20° Bé. HCl and filtered. The filter cake was washed with water and dried in vacuo at 70° C.

The crude dyestuff obtained above was purified via the acetate derivative as follows: 10 parts of the dyestuff, 35 parts of acetic anhydride and 5 parts of sodium acetate were heated on a steam bath for about 2 hours. The reaction mass was then poured into an ice-water mixture, and the diluted mass was stirred 2 hours and filtered. The filtered product, when crystallized twice from a mixture of benzene and Skellysolve B (essentially n-hexane), melted at 202–204° C. The acetate derivative thus obtained was saponified by refluxing for 2 hours 10 parts thereof in 500 parts by volume of 0.5 N alcoholic KOH solution (obtained by dissolving 80 parts of KOH pellets in 2500 parts by volume of 95% ethanol). The resulting solution was diluted with 500 parts of water to precipitate the dyestuff, which was filtered off as a dark brown mass. The filter cake was dissolved in acetone and the purified dyestuff was precipitated from the resulting solution by addition of 10% aqueous HCl. The dyestuff thus obtained, when dried and ground, was a reddish brown powder of M.P. 220–222° C. and has the formula

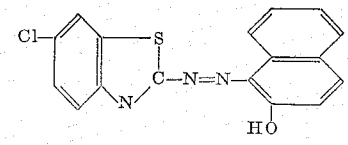

It dyed polypropylene containing a nickel compound blue shades of excellent fastness to washing, dry cleaning, crocking and to light.

Example V

One part of the water insoluble monoazo product of Example I above, 1-(6-ethoxy-2-benzothiazolylazo)-2-naphthol, was mulled with 5 parts of diethylene glycol and 0.1 part of Triton X–100 (isooctylphenol ether of polyoxyethyleneglycol) was added. About 4000 parts of warm (40°) water were added and 100 parts of isotactic polypropylene (containing an organic nickel compound in the amount of 0.12% nickel) were entered into the dyebath. The fiber was worked as the bath was gradually heated to boiling. The dyeing was continued at the boil for one hour and then the dyed fiber was removed from the bath, washed well in 0.25% soap solution at 60° C., rinsed in warm water and dried.

The resulting fiber was dyed a strong blue shade which withstood 110 hours exposure in the Fade-Ometer without noticeable alteration of shade. The wash fastness, crocking fastness and the fastness to dry cleaning solvents of this dyeing was excellent.

It can thus be seen that a novel group of benzothiazolyl-azonaphthol dyestuffs has been provided and that such dyes are eminently suitable for coloration of normally solid polymers of a-olefins having two to three carbon atoms and containing a Werner complex forming metal in deep blue shades of excellent fastness properties.

As will be evident to those skilled in this art, the invention is not limited to the details of the foregoing purely illustrative examples and changes in said details can be made without departing from the scope or spirit of the invention.

I claim:
1. A water-insoluble monoazo compound having the general formula

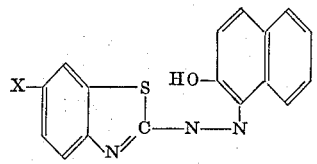

wherein X is selected from the group consisting of lower alkoxy, nitro, chloro, fluoro and bromo.

2. A monoazo compound as defined in claim 1 wherein X is an ethoxy group.

3. A monoazo compound as defined in claim 1 wherein X is a methoxy group.

4. A monoazo compound as defined in claim 1 wherein X is a nitro group.

5. A monoazo compound as defined in claim 1 wherein X is a chloro group.

References Cited by the Examiner

UNITED STATES PATENTS

| | | | |
|---|---|---|---|
| 2,832,764 | 4/1958 | Huenig | 260—158 |
| 3,097,196 | 7/1963 | Straley et al. | 260—158 X |

CHARLES B. PARKER, *Primary Examiner.*

FLOYD D. HIGEL, *Assistant Examiner.*